(12) United States Patent
Kim et al.

(10) Patent No.: US 6,787,972 B2
(45) Date of Patent: Sep. 7, 2004

(54) PIEZOELECTRIC ROTARY PUMP

(75) Inventors: Chulho Kim, Burke, VA (US); Santiago C. Sanday, Bethesda, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/113,640

(22) Filed: Mar. 29, 2002

(65) Prior Publication Data

US 2002/0158525 A1 Oct. 31, 2002

Related U.S. Application Data (63) Continuation-in-part of application No. 09/697,716, filed on Oct. 27, 2000, now Pat. No. 6,417,601.
(60) Provisional application No. 60/162,527, filed on Oct. 27, 1999.

(51) Int. Cl.[7] ............................ F04B 43/08; H01L 41/04
(52) U.S. Cl. ......................... 310/328; 417/474; 310/369
(58) Field of Search ................................. 310/328, 369, 310/333, 357, 359, 367; 417/474

(56) References Cited

U.S. PATENT DOCUMENTS

| | | | | |
|---|---|---|---|---|
| 3,177,382 A | * | 4/1965 | Green | 310/334 |
| 3,211,931 A | * | 10/1965 | Tehon | 310/333 |
| 3,230,505 A | * | 1/1966 | Parker et al. | 367/141 |
| 3,551,764 A | * | 12/1970 | Evans | 318/116 |
| 3,982,144 A | * | 9/1976 | Rogers et al. | 310/337 |
| 4,379,245 A | * | 4/1983 | Goldstein | 310/319 |
| 4,917,579 A | * | 4/1990 | Torma | 417/322 |
| 5,481,152 A | * | 1/1996 | Buschulte | 310/328 |
| 6,020,674 A | * | 2/2000 | Zhang et al. | 310/333 |

FOREIGN PATENT DOCUMENTS

| | | | | |
|---|---|---|---|---|
| EP | 0 413 397 A1 | * | 2/1991 | H01L/41/09 |
| JP | 2-76147 | * | 3/1990 | 360/73.09 |

OTHER PUBLICATIONS

A. E. Glazounov, Q. M. Zhang, C. Kim. Piezoelectric actuator generating torsional displacement from piezoelectric d15 shear response, Applied Physics Letters, vol. 72, No. 20, May 18, 1998, pp. 2526–2528.

(List continued on next page.)

*Primary Examiner*—Thomas M. Dougherty
(74) *Attorney, Agent, or Firm*—John J. Karasek; John Gladstone Mills, III (57) ABSTRACT

A high power and high torque density piezoelectric axial pump is developed using torsional actuator tube (stator) directly coupled to the rotor via two one way clutches. A cylindrical torsional actuator is comprised of a plurality of tubular piezoelectric ceramic segments poled along their length, aligned in alternate polarity and bonded together with intervening electrodes. When an alternating electric field is applied to the electrodes across adjacent segments to actuate the segments in their shear resonance mode, an end of the cylindrical actuator moves in a direction perpendicular to the length of the actuator in response to the applied electric field. This full cycle pump two sets of one way clutches positioned at the other end of the cylindrical actuator tube such that both ends of the tube move in opposite angular directions. These rotary displacements contribute alternatively from both ends of the cylindrical actuator (stator) are selectively transmitted to the rotor in unidirectional rotary motion via a two sets of one-way clutches. The clutches are built into both ends of the stator tube in such an orientation that the minute strokes are accumulated by converting the high frequency mechanical vibrations into continuous (or step-wise) motion of the rotor. Thus the power generated in the piezoelectric element is converted directly into rotary motion of the rotor with alternate blades for pumping fluids or slurry materials; the coupling mechanism results in a highly efficient pump. Specific values of the torsional angle and torque can be tailored for each application, by varying the actuator material, geometry and the applied alternating electric field.

14 Claims, 8 Drawing Sheets

OTHER PUBLICATIONS

Timothy S. Glenn and Nesbitt W. Hagood, Development of two-sided piezoelectric rotary ultrasonic motor for high torque, Active Materials and Structure Laboratory, Department of Aeronautics and Astronautica, Massachusetts Insititute of Technology, SPIE vol. 3041, 0277–786X/97, p. 326–338, 12/97.

Kim et al, Piezoelectric Ceramic Assembly Tubes for Torsional Actuators, Materials Science and Technology Division, Naval Research Laboratory, Part of the SPIE Conference on Smart Materials Technologies, Newport Beach, California, March 1999, SPIE vol. 3675, 0277–786X/99, pp. 53–61.

Kim et al, High Authority Piezoelectric Torsional Actuators, Materials Science and Technology Division, Naval Research Laboratory, 0–7803–4959–8/98, pp. 277–281.

Kim et al. Composite Piezoelectric Assemblies for Torsional Actuators, Naval Research Laboratory, NRL/MR/ 6380–97–7997, Mechanics of Materials Branch, Materials Science and Technology Division, Sep. 30, 1997, pp. 1–56.

* cited by examiner

Fig. 2 Frequency dependence of the torsional angle. Different clamping conditions are compared for the same actuator.

Fig. 3

Fig. 4 Schematic of a half-cycle motor.

Fig. 5a $L = \lambda / 2$

Fig. 8. (A) Different types of blades, helicoidal and helical, at constant pitch, (B) continuously graded pitch blade And staged graded pitch blade, (C) truncated conical outer tube and truncated conical axle.

Fig. 9 Applications of piezoelectric rotary propulsor.

PIEZOELECTRIC ROTARY PUMP

This application is a continuation in part of U.S. application Ser. No. 09/697,716 now U.S. Pat. No. 6,417,601 filed Oct. 27, 2000, and claims priority from provisional U.S. patent application Ser. No. 60/162,527, filed on Oct. 27, 1999.

BACKGROUND OF THE INVENTION

1. Field of the Invention

The present invention relates to axial pumps, and more specifically, to axial pumps driven by piezoelectric torsional vibration driven motors.

2. Description of the Background Art

The use of piezoelectric ceramic materials such as lead zirconate titanate (PZT) is well known for applications for sensors, transducers, actuators, and other electromechanical devices.

Many actuators have been developed using electroactive materials, including the torsional actuator disclosed in U.S. Pat. No. 6,020,674. This torsional actuator uses an even number of alternately poled segments of electroactive material which are arranged side by side. The segments are bound together in an integral structure, with conductors positioned between adjacent segments. Under an applied electric field, the torsional actuator produces large angular displacement and a high torque. Similarly, a torsional piezoelectric actuator is described in Glazounov, A. E. Zhang, Q. M., Kim, C. "Piezoelectric Actuator Generating Torsional Displacement from Piezoelectric $d_{15}$ Shear Response" Applied Physics Letters 72, pages 2526–2528, 1998.

For some applications, a large rotational motion with a large torque output is demanded. For example, vibration and noise control systems for helicopter rotor blades require an actuator which can provide large amplitude rotational motion with a high torque.

Piezoelectric ultrasonic motors have been developed using traveling wave and standing wave theories which provide higher torque density than electromagnetic motors. An example of the current art in piezoelectric motor technology is provided in "Development of a Two-Sided Piezoelectric Rotary Motor for High Torque", T. S. Glenn, W. G. Hagwood, SPIE Volume 3041, 1997. These piezoelectric ultrasonic motors are of limited application, however, because they have either lower power density or lower efficiency than conventional electromagnetic motors.

A compact, simple, lightweight motor which uses a torsional actuator as a stator could provide high torque density, high power density, and high efficiency in response to an alternating electric field.

Axial flow pumps with moving shafts within stationary housings are well known in the art for transferring liquids, granular solids, gases, and slurries. These pumps are may be powered by different power sources.

As opposed to most axial flow pumps that operate with moving shafts within stationary housings, the new pump disclosed and claimed operates with helical fan blades attached within the moving housing as a shaft. The shaft is driven by a piezoelectric torsional actuator as described in U.S. Pat. No. 6,020,674, which is incorporated by reference here, and U.S. patent application Ser. No. 09/697,716 claiming priority to provisional application 06/162527 filed Oct. 27, 1999.

It is an object of this invention to provide an axial bidirectional flow pump driven by a full cycle piezoelectric torsional motor which is compact, light, and a high power density device.

DETAILED DESCRIPTION

Figure 1A:
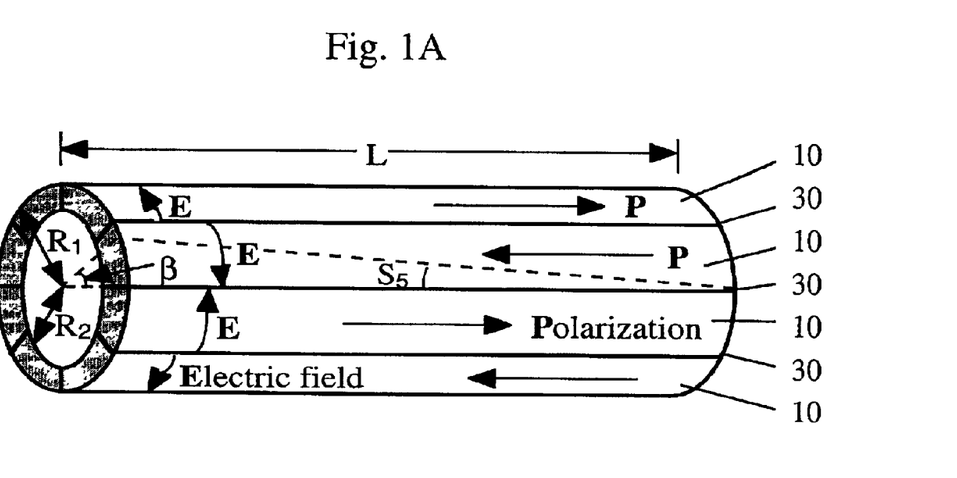
FIG. 1a shows a torsional actuator and the relationship between the polarization of electroactive segments and the applied electric field.
Figure 1B:
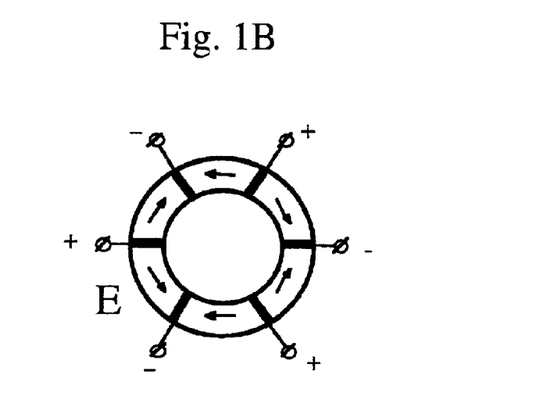
FIG. 1b shows the relationship between the polarization and the applied electric field for the torsional actuator.
Figure 2:
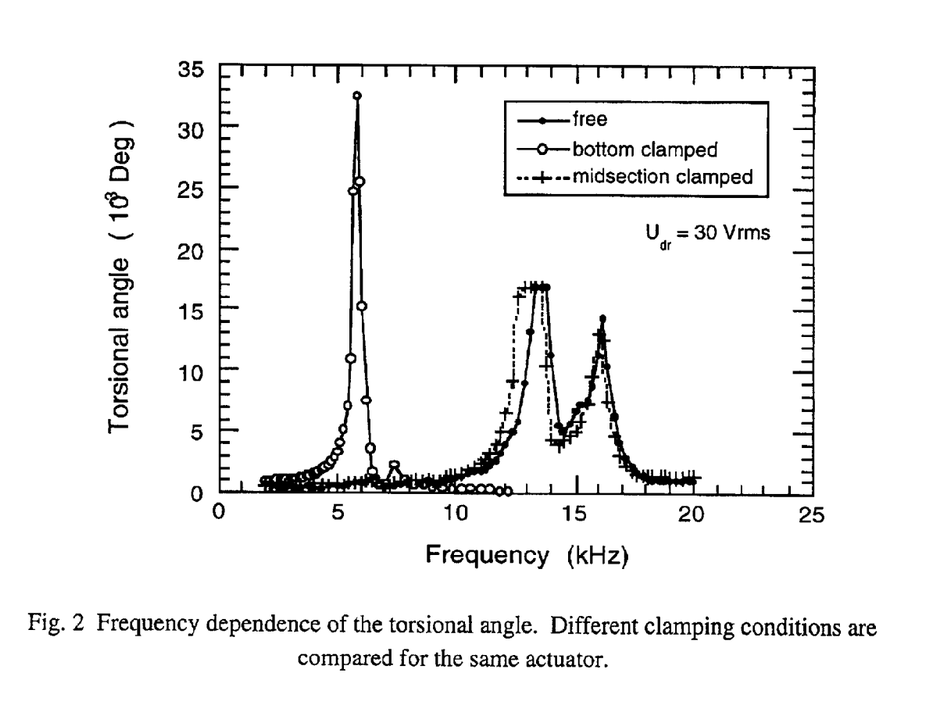
FIG. 2 shows the frequency dependence of a torsional actuator under applied electric fields for different clamping conditions.

A torsional motor and pump as described herein includes a stator, a clutch, a rotor. A torsional actuator is used as the motor stator. FIGS. 1a and 1b illustrate the torsional actuator. Several torsional actuators which may be used for this purpose are described in U.S. Pat. No. 6,020,674, incorporated herein in its entirety. The torsional actuator uses an even number of alternately poled segments 10 of electroactive material which are arranged side by side. The segments are bound together in an integral structure, with electrical conductors 30 positioned between adjacent segments. An electrically conductive epoxy or other conductive adhesive may be used to bond the segments together and to act as the conductor.

Each electroactive segment is continuously poled along its length, and the segments are arranged so that adjacent segments have the polarization direction opposite to each other. The conductive elements are connected electrically in parallel, allowing an electric field E to be applied to each segment in a direction perpendicular to the polarization $P_S$ of each segment 10. The relationship between the direction of polarization and the applied field for adjacent segments is shown in FIG. 1a. An applied electric field induces a shear deformation in each segment. The shear strain α is proportional to applied electric field E and the shear piezoelectric coefficient $d_{15}$, $$\alpha = d_{15} E \quad (1)$$

Due to the cylindrical symmetry of the actuator, the shear strain α is directly transformed into angular displacement of an end of a segment with respect to the other end of a segment, β, such that $$\beta = \left(\frac{L}{R}\right)\alpha = \left(\frac{L}{R}\right)d_{15}E \qquad \text{Equation (2)}$$

where L is the length of the actuator segment, R is the radius of the actuator. By using an actuator with a large value of L/R, a large torsional displacement β can be achieved, even though shear strain α is usually quite small in piezoelectric materials.

If the length of the actuator, L, is greater than the radius of the actuator, R, then the torsional displacement of the end of the actuator β will be larger than the shear strain α induced in each segment of the actuator, and the actuator will be an effective amplifier of angular displacement. The value of L/R is therefore considered the geometric amplification factor.

When a voltage V is applied to the actuator segments, the electric field E in each segment will be:

$$E \approx \frac{nV}{\pi(R_1 + R_2)} = \frac{nV}{2\pi R} \qquad \text{Equation (3)}$$

The torque developed by the actuator, T, will be $$T = \frac{d_{15}nV(R_1 - R_2)}{s^E_{44}}R \qquad \text{Equation (4)}$$

where R is equal to the average of the inner and outer radii of the actuator (R=(R$_1$+R$_2$)/2), n is the number of segments, and S$^E_{44}$ is the shear elastic compliance at a constant electric field. Hence, although the angular displacement β increases linearly with the length of the actuator L, the torque T is independent of the length of the actuator.

The material selected for the actuator segments should have a high shear response under the limiting electric fields (the field limit before de-poling occurs) as well as a high shear piezoelectric coefficient d$_{15}$ under operating conditions. The material should also have a low elastic shear compliance and a high de-poling shear stress.

Actuators with a polygonal cross section may be assembled using long segments having trapezoidal cross sections. Actuators with a circular cross section may be assembled using segments having a circular arc cross section. Other actuator configurations may be built, as will be apparent to those skilled in the art.

Example of a Torsional Actuator

An actuator was manufactured using PZT-5A material obtained from EDO Inc., which has a high maximum shear piezoelectric response (greater than 1,200 micro-strain). This material demonstrated a significant nonlinear behavior with respect to the field. The PZT-5A has a d$_{15}$ coefficient at high fields (4.8 kV) of 2,500 pC/N, compared to a d$_{15}$ coefficient of 700 pC/N at low fields (less than 200 V). There is, however, no marked response (d$_{15}$ change) to the shear load applied up to stresses of 10 MPa.

A continuous poling fixture was used to apply this polarization in the longitudinal direction. The continuous poling was applied by moving the two conductive rubber electrodes along the length of the segment (5 to 15 cm) at a rate of 0.2 to 1.0 cm per minute, after applying the desired electric field to one end. Moving the electrodes allows the segment to be exposed to sufficient electric field strength needed to approach full uniform spontaneous polarization while avoiding material breakdown which would be the result of applying a large voltage across the entire length of the segment.

A segment of PZT-5A was poled by moving two electrodes separated by a distance of 1.4 cm along the long segment at a rate of 0.2 to 1.0 cm per minute with 20 kV between electrodes while the entire system was immersed in a dielectric oil bath heated to a temperature of 80 to 100° C. These long segments of PZT-5A exhibited a large d$_{33}$ value of greater than 460 pC/N. This is more than 95% of the d$_{33}$ value of shorter PZT-5A samples which were poled fully using a conventional poling method (~480 pC/N).

The continuously poled segments were assembled into a cylindrical actuator and were joined by a high shear strength conductive epoxy, which serves as an electrical conductor and to adhere the adjacent sides of the segments to one another. The epoxy was selected based on its high shear strength and a curing temperature below the Curie temperature of the material being joined. An example of a suitable epoxy is MB-10HT/S, which is then cured using a vacuum bagging process, which typically results in joints which are approximately 25 μm in thickness and very uniform along the length of the joints. This process is described in "Piezoelectric Ceramic Assembly Tubes for Torsional Actuators," C. Kim, A. E. Glazounov, F. D. Flippen, A. Pattnaik, Q. Zhang, D. Lewis, SPIE Proceedings, Volume 3675, March 1999, incorporated herein in its entirety. Other methods of joining the segments and conducting an electric field may be used, however, the joining method must have sufficient shear strength to maintain the structural integrity of the actuator.

Other examples of torsional actuators and the continuous poling fixture are described in the report NRL/MR/6380-97-7997, "Composite Piezoelectric Assemblies for Torsional Actuators," C. Kim, T. Jensen, V. DeGiorgi, B. Bender, C. Cm Wu, D. Flippen, D. Lewis, Q. Zhang, V. Mueller, M. Kahn, R. Silberglitt, and L. K. Len, Sep. 30, 1997, incorporated herein in its entirety. Additional examples of torsional actuators are described in "Piezoelectric Ceramic Assembly Tubes for Torsional Actuators," C. Kim, A. E. Glazounov, F. D. Flippen, A. Pattnaik, Q. Zhang, D. Lewis, SPIE Proceedings, Volume 3675, March 1999; "Piezoelectric Actuator Generating Torsional Displacement from Piezoelectric d15 Shear Response," A. E. Glazounov, Q. Zhang, and C. Kim, Applied Physics Letters, Volume 72, Number 20, May 1998, and "High Authority Piezoelectric Torsional Actuators," C. Kim, D. Lewis, C. Cm Wu, A. E. Glazounov, Q. Zhang, Proceedings of the Eleventh IEEE International Symposium on Applications of Ferroelectrics (ISAF), # 0-7803-4959-8/98, all incorporated herein in their entirety.

Equivalent circuit analogy around the resonant frequency, f$_r$, shows that the resonant frequency dependence of the torsional angle β is given by:

$$\beta(f_r) = d15E\ (L/R_1)Q_m \qquad (5)$$

where d$_{15}$ is the piezoelectric shear coefficient and Q$_m$ is the mechanical quality factor of the actuator. The mechanical quality factor Q$_m$ is an additional torsional angle amplification term, which can be utilized in piezoelectric ultrasonic motor development. In order to provide a large angular displacement β a material having a high Q$_m$ is chosen for the actuator segments. For example, in one embodiment, a hard piezoelectric ceramic material (APC-841, available from APC International, Ltd.) was selected as an actuator material because of its high Q$_m$ value.

Torsional Motors

A torsional actuator as described above, with electroactive segments, having a length L and a radius R, can be used as the stator in a torsional motor. Such a torsional motor provides high torque and high efficiency. A torsional motor has several components, including a stator, a clutch, and a rotor.

Figure 3:
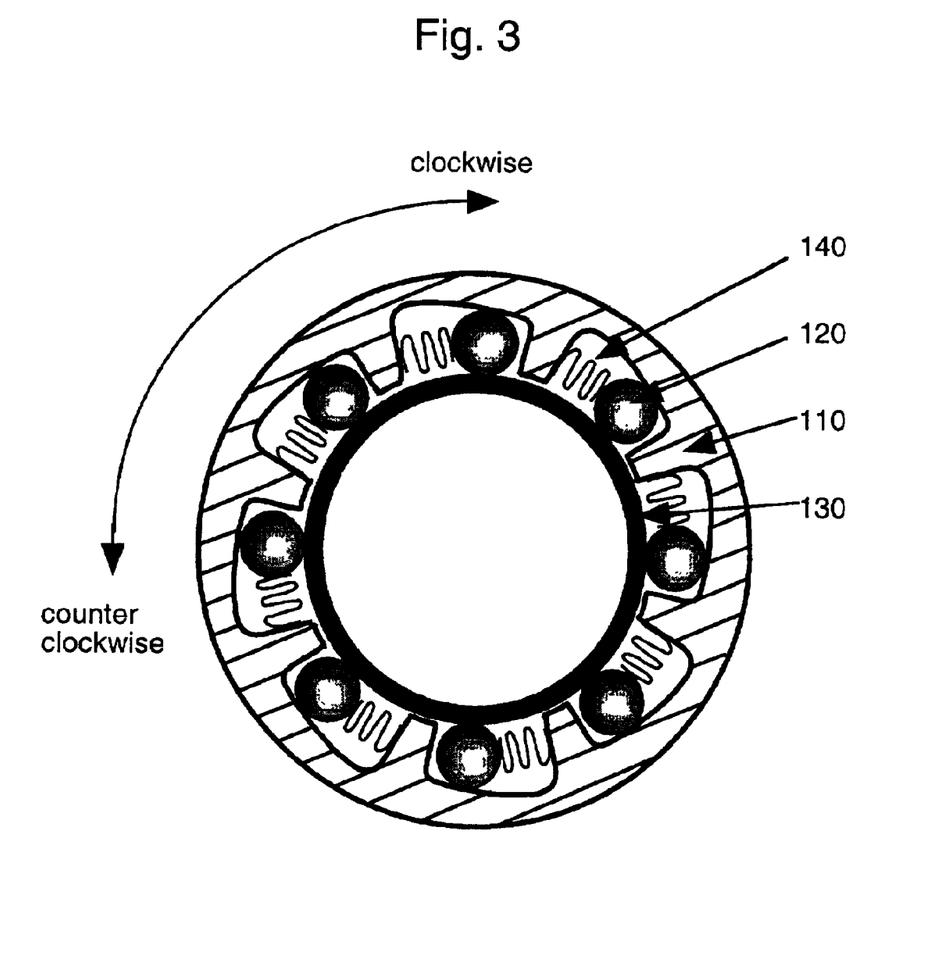
FIG. 3 shows a one way roller clutch for use in a torsional electroactive pump.

When an alternating electric field is applied to a torsional actuator, if one end of the actuator is fixed, the other end will twist back and forth in response to the applied electric field. A one way clutch is used to transmit the angular displacement in one direction only to a rotor, ensuring the rotor turns in the same direction at all times. An example of a one way roller clutch which may be used is shown in FIG. 3. The torsional actuator (not shown) is fixedly attached to the clutch cam 110, so as the torsional actuator and cam 110 rotates in a counter-clockwise direction, the rollers 120 jam between the rotor 130 and the cam 110, locking them together. This allows the angular displacement of the actuator to be transmitted to the rotor. As the actuator and cam 110 rotate in an opposite (clockwise) direction, the springs 140 are compressed by the rollers 120, the rollers 120 slip, and the actuator and cam 110 is allowed to rotate freely, so no clockwise angular displacement of the actuator is transmitted to the rotor. Thus, the roller clutch transmits angular displacement of the actuator to the rotor only if the actuator and cam 110 move in the counterclockwise direction when the rollers 120 are wedged between the tilted slope of the cam 110 and the surface of the rotor 130.

Half-cycle Motors

Figure 4:
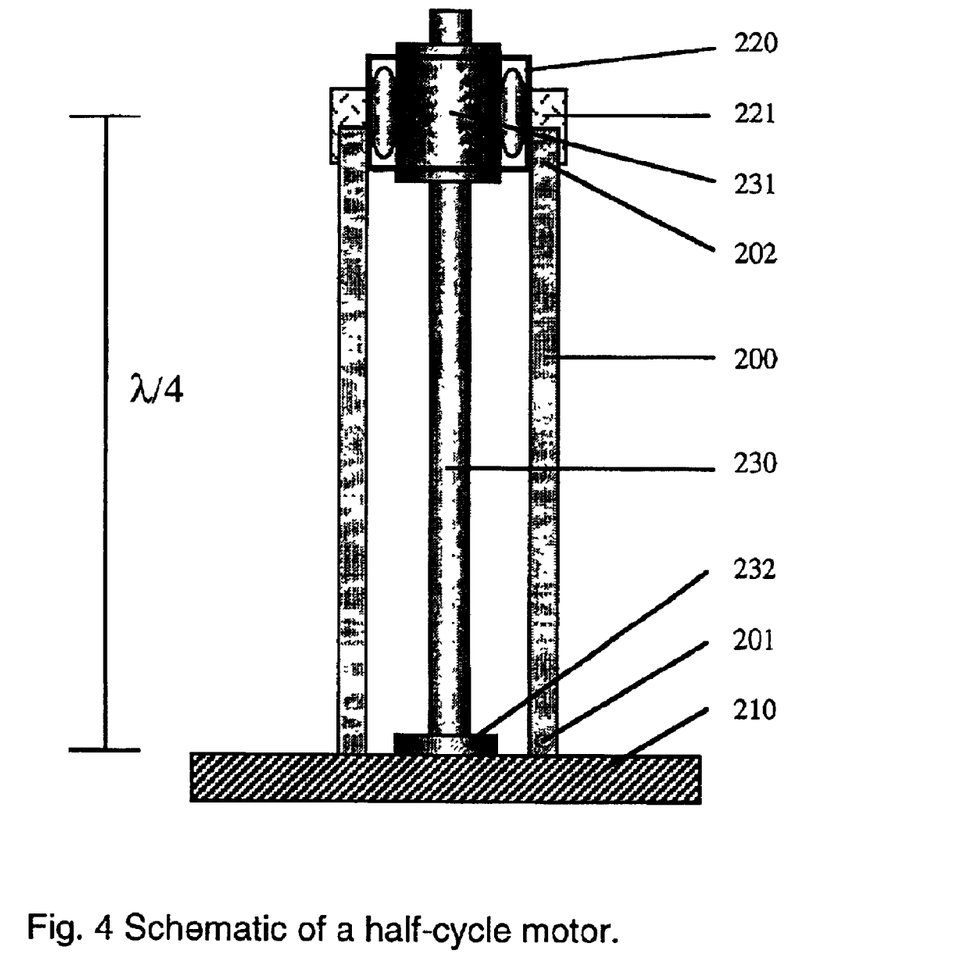
FIG. 4 shows a half cycle torsional electroactive pump using a torsional actuator.

A cross sectional view of a half cycle torsional electroactive motor is shown in FIG. 4. A torsional actuator 200 is fixed at one end 201 to a support member 210, while the other end of the torsional actuator 202 is allowed to move freely in response to an electric field applied to conductors across the electroactive segments of the torsional actuator. The torsional actuator 200 is as described previously and as shown in FIGS. 1a and 1b. A one-way clutch 220 (typically having rollers, a cam, and springs) is used to transmit the angular motion of the torsional actuator 200 to the rotor 230 in one direction only. When an alternating electric field is applied to the torsional actuator 200, the free end of the torsional actuator 202 will be angularly displaced in an amount β according to Equation 2 above. When the free end of the torsional actuator 202 is displaced in one angular direction, the one-way clutch 220 will transfer this motion to the rotor 230. When the free end of the torsional actuator 202 is displaced in the other direction, the one way clutch 220 is disengaged from the torsional actuator 200 and will not transmit the angular displacement of the torsional actuator's free end to the rotor 230.

As shown in FIG. 4, the end of the torsional actuator 201 is fixed and clamped to support member 210 and is a half-cycle torsional motor.

The torsional pump motor may be operated at a resonant frequency $f_r$. If the half cycle motor is operated in a resonance mode, the actuator optimally has a length L equal to ¼ λ, where the wavelength λ corresponds to the natural frequency $f_r$ of the actuator. This allows the maximum angular displacement β to occur at the free end of the actuator, and allows the clutch to transmit maximum angular displacement from the torsional actuator to the rotor. The natural frequency of the actuator, $f_r$, is dependant on the material properties of the electroactive segments which make up the torsional actuator, and the length of the actuator, according to the following equation:

$$f_r = \frac{1}{4L\sqrt{\rho(s_{44}^E)}} \qquad \text{Equation (6)}$$

Referring again to FIG. 4, the effective length of the torsional actuator (from the fixed end of the actuator 201 to the clutch roller 220 is L=¼ λ so the end of the actuator 201 is a nodal point, and has very low vibration.

Thus, when driving the actuator tube at its resonant frequency, and accumulating the produced angular displacement by using a direct coupling between the actuator (stator) and rotor via the one way clutches, a high efficiency piezoelectric motor generates continuous rotation with precise control over angular positioning.

Full Cycle Torsional Motors

A full cycle torsional motor in which both ends of the torsional actuator transmit angular displacement can be used to increase power density, torque density, and efficiency. This full cycle motor transmits the displacement continuously to the rotor, without any half-cycle dead periods inherent in the half-cycle motors discussed above. A full cycle torsional motor has the advantage of compact size while providing twice the efficiency of the half-cycle motor. If the rotor, clutches, and torsional actuator are aligned, the torsional vibration of the electroactive segments will be transferred directly into rotary motion of the rotor.

Advantages provided by the full cycle torsional motor as described herein include an approximately ten fold improvement in power density over electromagnetic motors, and a twenty fold increase in power density over current piezoelectric motors. Such a full cycle torsional motor also provides an approximately thirty fold increase in torque density over current electromagnetic motors and a three fold increase over current piezoelectric motors, as illustrated in Table 1 below.

TABLE 1

Comparison of electromagnetic (EM) and PZT ultrasonic (US) motors

| Type | Model/ Description | Maker | Stall Torque (Ncm) | Max Speed (rpm) | Peak Eff (%) | Mass (g) | Torque Density (Ncm/kg) | Power Density (W/kg) |
|---|---|---|---|---|---|---|---|---|
| EM | 1319E003S/Brush DC | Micro Mo | 0.33 | 13,500 | 71 | 11.2 | 29 | 104 |
| EM | FK-280-2865/Brush DC | Mabuchi | 1.52 | 14,500 | 53 | 36 | 42 | 160 |
| EM | Brush DC | Maxon | 1.27 | 5,200 | 70 | 38 | 33 | 45 |
| EM | Brushless DC | Aeroflex | 0.98 | 4,000 | 20 | 256 | 3.8 | 4.0 |
| EM | Brushless DC | Kannan | 8 | 5,000 | 80 | 600 | 13 | 17 |
| US | Standing wave, twist coupler | Kumada | 133 | 120 | 80 | 150 | 887 | ~50 |

TABLE 1-continued

Comparison of electromagnetic (EM) and PZT ultrasonic (US) motors

| Type | Model/Description | Maker | Stall Torque (Ncm) | Max Speed (rpm) | Peak Eff (%) | Mass (g) | Torque Density (Ncm/kg) | Power Density (W/kg) |
|---|---|---|---|---|---|---|---|---|
| US | USR60, disk-type | Shinsei | 62 | 105 | 23 | 230 | 270 | 16 |
| US | EF300/2.8 L, ring-type | Canon | 16 | 40 | 35 | 45 | 356 | ~5 |
| US | Two-sided prototype | MIT | 170 | 40 | 13 | 330 | 520 | 73 |
| US | 8-mm ring prototype | MIT | 0.054 | 1,750 | N/a | 0.26 | 210 | 108 |
| T. Glenn et. al, 'Development of a two-sided piezoelectric rotary ultrasonic motor for high torque', SPIE vol. 3041, pp. 326–338, 1997 | | | | | | | | |
| US | 26-mm torsional actuator | NRL* | 430 | 7,000 | 80 | 350 | 1230 | 1800 |

*Projected results from a full-cycle piezoelectric torsional vibration driven motor The 26 mm torsional actuator (row 11 of Table 1) will have superior power density and torque density compared to currently available electromagnetic motors (rows 1–5 of Table 1) and to currently available piezoelectric motors which rely on standing wave and traveling wave theories (rows 6–10 of Table 1).

Figure 5A:
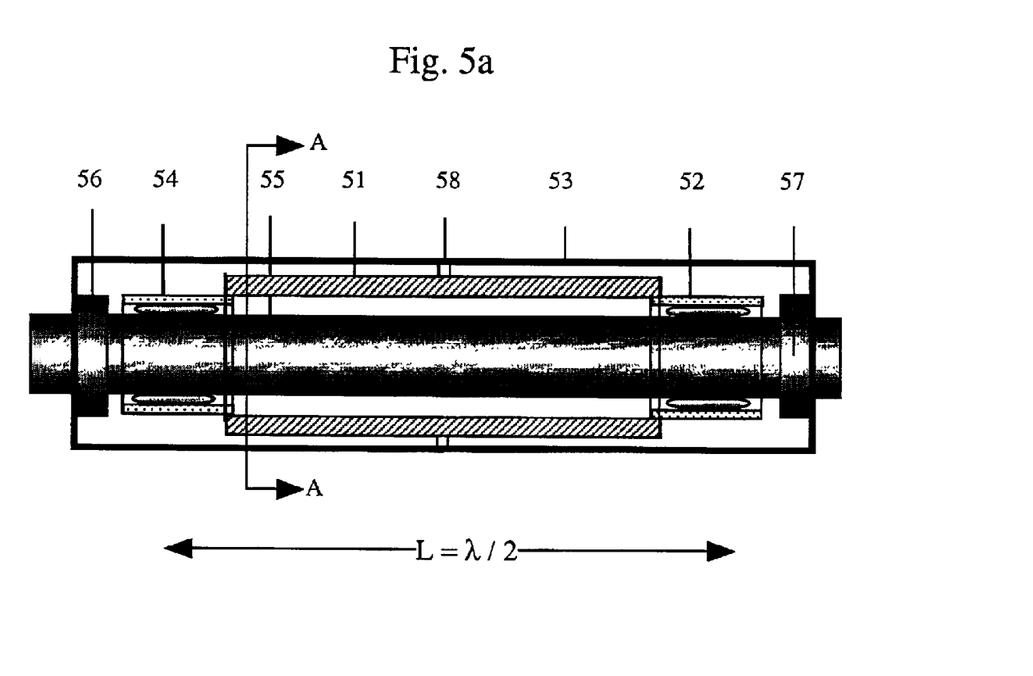
FIG. 5a is a schematic of a full cycle torsional electroactive pump using a torsional actuator.
Figure 5B:
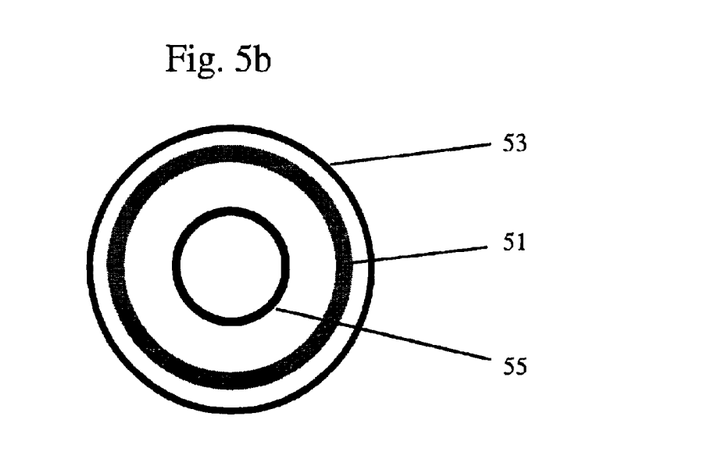
FIG. 5b is a cross sectional view of the actuator, rotor and housing shown in FIG. 5a at section AA.

A full cycle electroactive torsional motor driven by piezoelectric torsional vibration is shown in FIGS. 5a and 5b. A torsional actuator 51 can be fixed at its midpoint 58 to a housing 53 or other structure. Because only the midpoint is fixed, both ends of the actuator 51 are free to move in response to the application of an electric field across the electroactive segments. The torsional actuator 51 acts as a stator which generates high frequency torsional vibrations at both ends. When driving the actuator at a resonant frequency $f_r$, the midpoint of the tube is a nodal point and is stationary and both ends of the actuator oscillate in opposite directions with respect to each other. One way clutches are located at each end of the actuator 51. This symmetric configuration allows the full cycle of the oscillating displacement to be transmitted to the rotor, 55.

A one-way clutch 52 is attached to an end of the actuator 51, so that the end of the actuator 51 and the clutch 52 move together as follows: The one-way clutch 52 is in contact with the rotor via clutch rollers so that the clutch transmits the angular displacement of the actuator 51 to the rotor only if the actuator moves in the clockwise direction as shown in FIG. 5a. A second one-way clutch 54 is attached to the other end of the actuator 51, so that this other end of the actuator 51 and the second one way clutch 54 move together as follows: This second one way clutch 54 is in contact with the rotor via clutch rollers so that the second one way roller clutch 54 transmits the angular displacement of the actuator 51 to the rotor 55 only if the actuator moves in a clockwise direction.

An alternating electric field at the resonant frequency of the actuator is applied to the actuator segments as described above. Thus, the first one-way clutch 52 is used to rotate the rotor in the clockwise direction for the half cycle period, while the other end of the actuator tube connected to the second roller clutch 54 is disengaged from the rotor. In the next half cycle period, the first one way roller clutch 52 is disengaged from the rotor while the second clutch 54 rotates the rotor 55 in the clockwise direction. This full cycle torsional motor design provides full cycle rotary displacement in one direction (clockwise in the example of FIG. 5b). The revolution speed of the rotor will be a full cycle rotary angle multiplied by the resonant frequency. Optionally, rollers 56 and 57 may be attached to a housing 53, or other structural member, to maintain the rotor shaft in a stable holding position.

The length L of the actuator for use in a full-cycle piezoelectric motor should be equal to $\lambda/2$, where $\lambda$ corresponds to the natural frequency $f_r$ of the actuator. This allows the maximum angular displacement $\beta$ to occur at the free ends of the actuator, and allows the motor to transmit maximum angular displacement to the rotor. The natural frequency, $f_r$, of a segment is dependant on the length and material properties of the actuator segments according to Equation (6) above.

Alternatively, a full cycle motor can be built to operate in a non-resonant mode, in order to transmit higher force at a lower speed. In a non-resonant motor embodiment, the actuator is subjected to a low frequency, high electric field. It is not necessary that the length of the actuator segments be built to correspond to the natural frequency in the non-resonant mode. The twist angle per cycle is proportional to the L/R ratio and the torque is independent of actuator length, so the geometry of the actuator may be varied to achieve the intended result.

Axial Flow Pump

The actuator ("torque tube") described above has the novel property that, although the intrinsic shear strain of piezoelectric ceramics are small, the stroke amplitude is amplified by the length to radius ratio of the tube without significant loss of dynamic torque output. At the resonant frequency of the actuator, the amplitude of the rotary angle is amplified, additionally, by the mechanical quality factor of the device. For long stroke applications, a rotary inchworm/motor device has been developed using roller clutches to accumulate the minute displacement of the rotary actuator over many cycles of the applied alternating current field.

Since the rotary actuator design features are simple and compact and provide direct electromechanical energy conversion, pumps and propulsors with high power and high torque density may be made using the rotary actuator as a driver.

Figure 6:
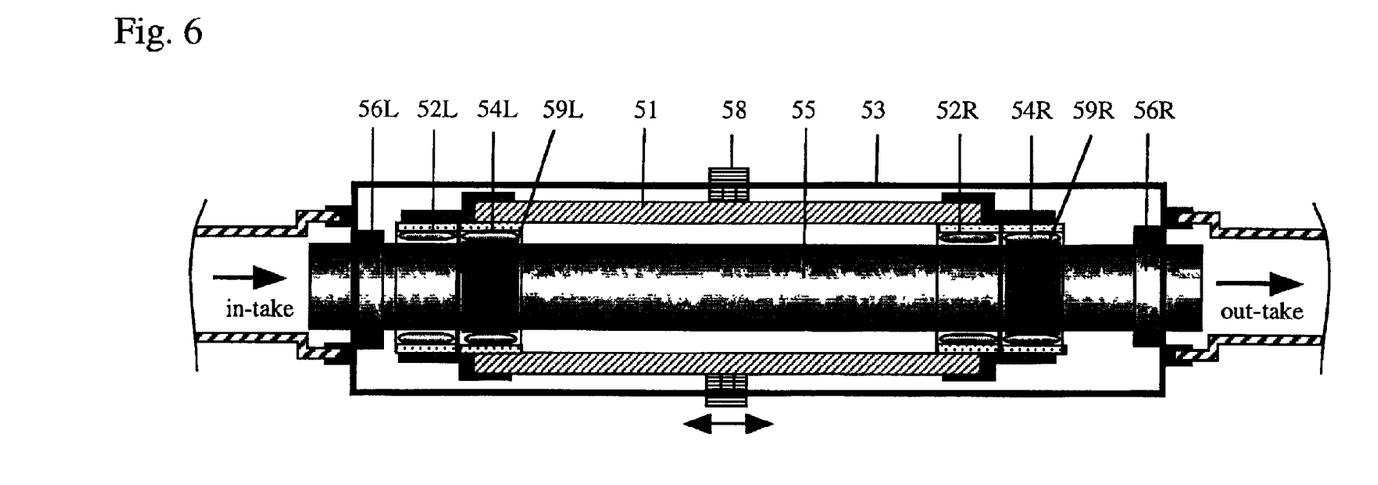
FIG. 6 is a cross sectional view of an axial flow pump driven by a full cycle torsional electroactive motor according to the invention.

FIG. 6 illustrates a cut away view of an axial pump and motor according to the invention. The torsional actuator tube 51 is comprised of alternating segments of longitudinally poled piezoelectric ceramic with electrically conductive adhesive between the segments, as described above. Two sets of one way clutches transfer rotation of the actuator tube 51 to the rotor 55, so the rotor turns continuously in one direction or the opposite direction in response to an alternating current applied to the actuator segments at the resonant frequency of the actuator tube, depending on which set of clutches is engaged. Thus the axial pump is either unidirectional or bidirectional. This is described more specifically above.

A first set of one way clutches 52L and 52R allow the rotor to turn in one direction when the opposite set of clutches 54L and 54R are disengaged.

A second set of one way clutches 54L and 54R allow the rotor to turn in an opposite direction when the first set of clutches 52L and 52R are disengaged.

The coordinated action of the two sets of clutches provides the bidirectional axial pump capacity. A set of contact spacers 59R and 59L which are attached to the rotor allow the rotor to turn in one direction when the first set of clutches 54L and 54R are engaged and when second set of clutches 52R and 52L are disengaged by sliding the torsion tube assembly to the right via the sliding knob 58. If the sliding knob is moved left, then the opposite effect will occur so that the rotor will move in the opposite direction.

The rotor 55 acts as a housing for an axial flow pump, shown generally as 60 in FIG. 6. The axial flow pump has several components: a rotor 55 that rotates in response to an applied voltage, an intake 62, a discharge 64, and a blade 66 attached to the housing 55. The rotor 55 is hollow, having an inner wall that defines a channel within the rotor in which The blade 66 has a helicoid shape. The inner wall of the rotor forms the outside of a channel within the rotor The rotor 55 has a constant diameter from the intake to the out-take area. The rotor 55 has a constant diameter from the intake to the out-take area.

Figure 7:
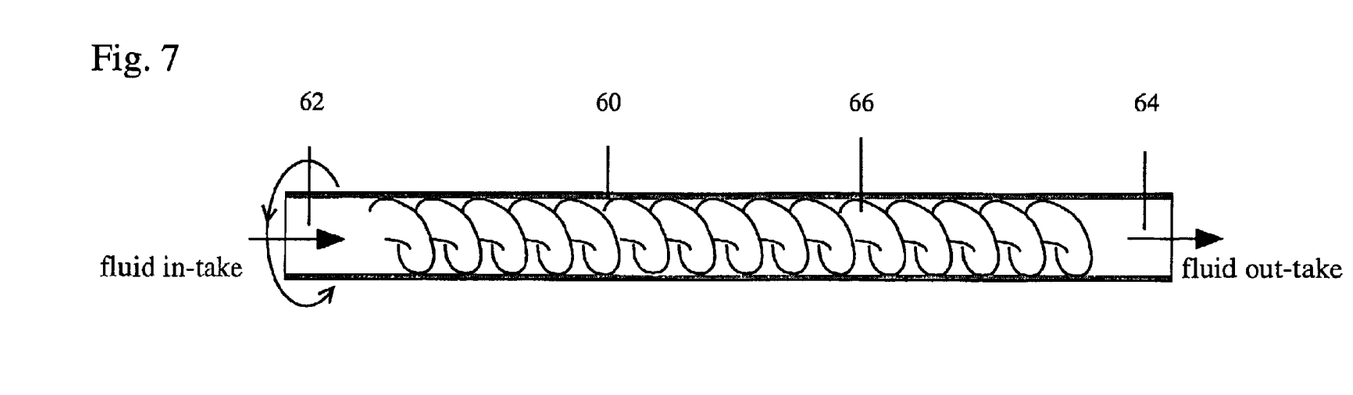
FIG. 7 is a cross sectional view showing fluid intake and fluid out-take from the pump.

Refer to FIG. 7 for an illustration of the operation of the axial-flow pump 60. As the rotor 55 rotates in a clockwise direction with blade 66, the fluid enters at the in-take 62. The rotary motion of the rotor 55 and the blade 66 forces the entering fluid to be transferred along the axis of the pump 60 to the out-take section 64.

The pump 60 can transfer many different materials, including liquid, gases, granular materials, or combinations of these, such as slurries from the intake or output, depending on the configuration of the inside surface of the rotor and blade 66. The shapes of the inside of the rotor 55 and the surface of the blade 66 may be varied to achieve a desired volume throughput (including constant high throughput or intermittent throughput), out-take velocity, or out-take pressure.

Figure 8:
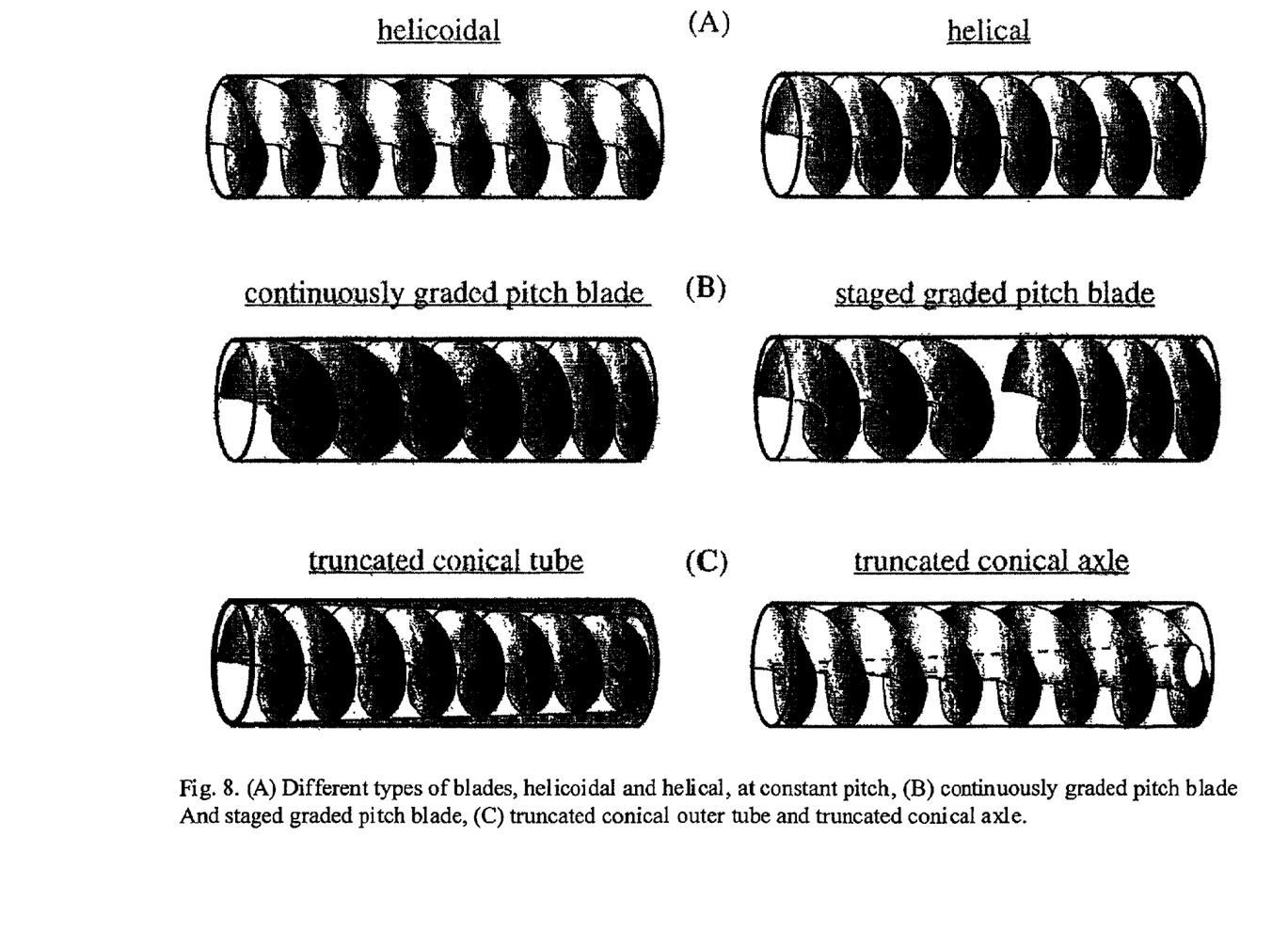
FIG. 8a is a cross sectional view showing helicoidal and helical blades at constant pitch.
FIG. 8b is a cross sectional view showing continuously graded pitch blade and staged graded pitch blade.
FIG. 8c is a cross sectional view showing a truncated conical outer tube and truncated conical axle.

In another embodiment, the blade may be helical or helicoidal (FIG. 8a). In other embodiments, the pitch of the blade may be continuously graded (FIG. 8b) or graded differently for different stages within the rotor 55 (FIG. 8b), and may change continuously or in stages. In an alternative embodiment, the inside surface of the rotor 55 may be in the shape of a truncated cone (FIG. 8c). In another embodiments, the central axle portion of the blade may be shaped as a truncated conical axle (FIG. 8c). Varying the varying the cross-sectional area of the blade 55 or of the central axle portion along the length of the rotor will allow a variation in the fluid volume per unit length of blade along the length of the blade 55.

Figure 9:
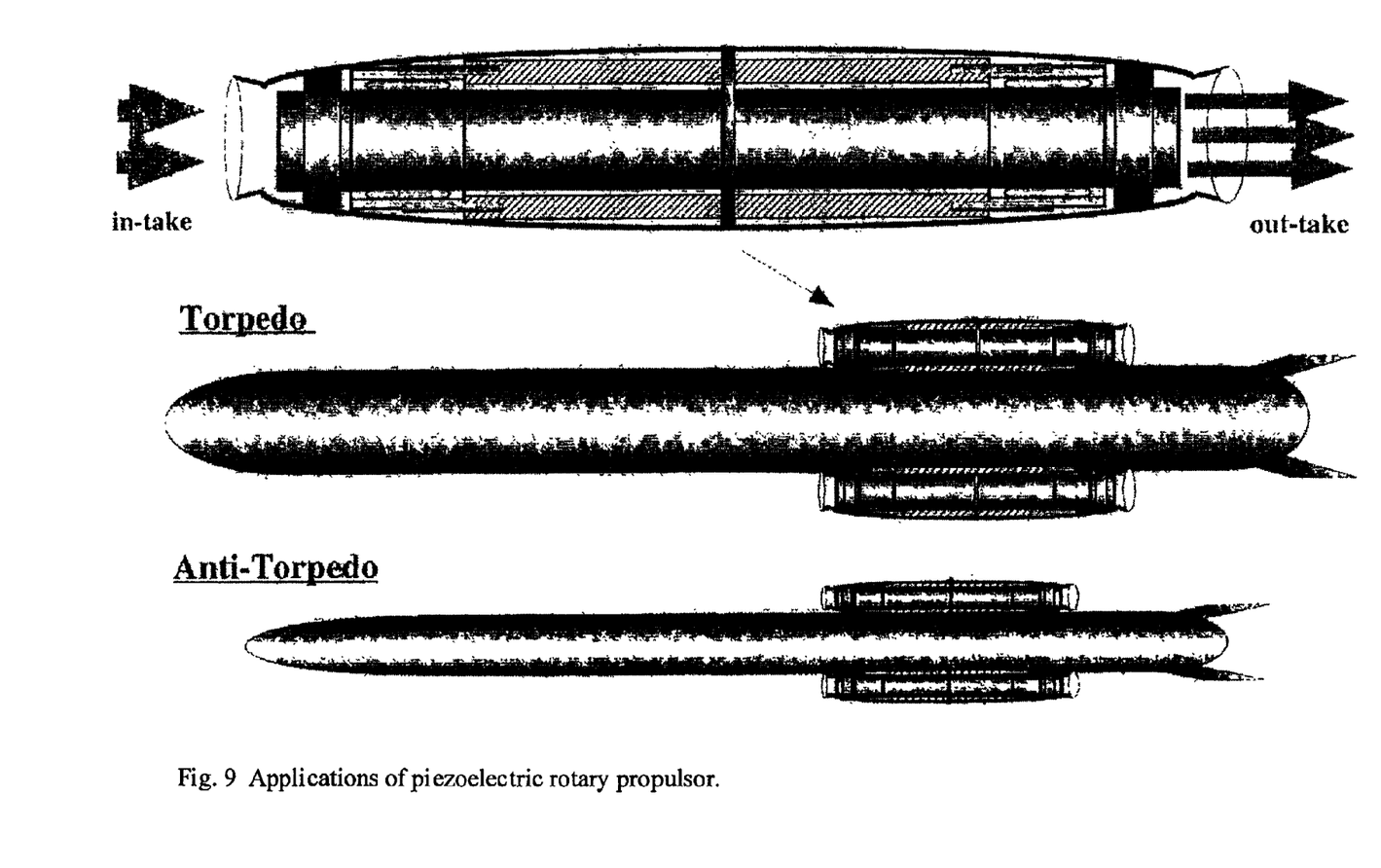
FIG. 9 shows other applications of the pump including torpedo and anti-torpedo applications.

In an alternative embodiment shown in FIG. 9, a propulsor system for efficiently moving through water or another liquid is shown. This propulsion system may be used for the propulsion of underwater vehicles such as torpedoes, remotely operated vehicles, ships and submarines. The propulsor includes a piezoelectric torsional actuator system driving the rotation of a rotor, and a propellor blade or blades within the rotor for moving water from an intake to a discharge.

This simple design has several desirable features, including high power discharge, torque density, and thrust.

The above description of several embodiments of the invention is intended for illustrative purposes only. Numerous modifications can be made to the disclosed configuration, while still remaining within the scope of the invention. To determine the scope of the invention, refer to the following claims.

What is claimed is:

1. A torsional motorpump, comprising:
    a torsional actuator, having:
        a plurality of segments,
        said segments having a length,
        each segment comprised of an electroactive material which is poled along its length dimension,
        conductors disposed between adjacent edges of said side by side segments,
        power supply means connected to said conductors such that oppositely directed electric fields may be applied across said side by side segments so to achieve concurrent rotational movement of a first end said side by side segments,
        a first one way clutch positioned at a distance from the midpoint of said torsional actuator,
        a rotor connected to said first one-way clutch, such that angular displacement said torsional actuator at said distance from said midpoint is transmitted by said one-way clutch to said rotor, and
        a second one-way clutch positioned at a second distance from said midpoint of said torsional actuator and connected to said second one-way clutch connected to said rotor, such that angular displacement of said torsional actuator at said second distance from said midpoint is transmitted to the rotor.

2. A torsional motor pump, comprising:
    a torsional actuator, having:
        a plurality of segments,
        said segments having a length,
        each segment comprised of an electroactive material which is poled along its length dimension,
        said segments being arranged side by side into a cylindrical cross sectional arrangement exhibiting a radius, wherein said length is greater than said radius,
        adjacent segments arranged such that their respective polings are in opposed directions,
        conductors disposed between adjacent edges of said side by side segments,
        power supply means connected to said conductors such that oppositely directed electric fields may be applied across said side by side segments so to achieve concurrent rotational movement of a first end said side by side segments,
        a first one way clutch positioned at a distance from the midpoint of said torsional actuator,
        a rotor connected to said first one-way clutch, such that angular displacement of said torsional actuator at said distance from said midpoint is transmitted by said one-way clutch to said rotor, and
        a second one-way clutch positioned at a second distance from said midpoint of said torsional actuator,
        said second one-way clutch connected to said rotor, such that angular displacement of said torsional actuator at said second distance from said midpoint is transmitted to the rotor.

3. A torsional motor pump as in claim 2, wherein said first one-way clutch is positioned at a first end of said torsional actuator and said second one-way clutch is positioned at a second end of said torsional actuator.

4. A torsional motor pump as in claim 2, wherein the distance between said first and said second one-way clutches is about λ/2, where X corresponds to the natural frequency $f_r$ of said torsional actuator.

5. A torsional motor pump as in claim 2, wherein said electroactive material is a ceramic material having a high piezoelectric response.

6. A torsional motor pump as in claim 2, wherein said segments are PZT-5A.

7. A torsional motor pump as in claim 2, wherein said segments are APC-841.

8. A torsional motor pump as in claim 2, wherein said conductor is a conductive adhesive.

9. A torsional motor pump as in claim 2, further comprising an inner housing structure disposed between said rotor and said clutches for transmitting one-way motion of the clutch to the rotor.

10. A torsional motor pump as in claim 2, further comprising means for fixing said actuator at a midpoint along the length of said actuator.

11. A torsional motor pump as described in claim 10, wherein said means for fixing said actuator at a midpoint along the length of said actuator is a housing attached to said actuator.

12. An electroactive motor, comprising:
- an electroactive material, capable of torsional rotation at distal ends about a central area, responsive to a selected electric field, and
- clutch means disposed to move responsively to said torsional rotation at a first distal end of said electroactive material and at a second distal end of said electroactive material.

13. An axial-flow electrically driven bidirectional pump comprising:
- a torsional motor having a torsional actuator,
- a rotor disposed coaxially with and within said an inner radius of said torsional actuator,
- a first one way clutch and a second one way clutch for transmitting motion of said torsional actuator to said rotor positioned at a distance from the midpoint of said torsional actuator,
- a second one-way clutch positioned at a second distance from said midpoint of said torsional actuator,
- a rotor disposed within said torsional actuator,
- said rotor positioned against said first and said second one-way clutch, such that an angular displacement of said torsional actuator at said distance from said midpoint is transmitted by said one-way clutches to said rotor, turning said rotor in a direction,
- said rotor comprising a hollow
- a shaft disposed within along a central axis o
- said second one-way clutch connected to said rotor, such that angular displacement of said torsional actuator at said second distance from said midpoint is transmitted to the rotor.

14. An axial bidirectional pump, comprising:
- a torsional actuator, having a plurality of segments,
- said segments having a length L,
- each segment comprised of an electroactive material which is poled along its length dimension,
- said segments being arranged side by side into a cylindrical cross sectional arrangement exhibiting a radius R, wherein said ratio of L to R is greater than one,
- adjacent segments arranged such that their respective polings are in opposed directions, conductors disposed between adjacent edges of said side by side segments,
- power supply means connected to said conductors such that oppositely directed electric fields may be applied across said side by side segments so to achieve concurrent rotational movement of a first end said side by side segments,
- a first one way clutch positioned at a distance from the midpoint of said torsional actuator,
- a rotor connected to said first one-way clutch, such that angular displacement said torsional actuator at said distance from said midpoint is transmitted by said one-way clutch to said rotor, and
- a second one-way clutch positioned at a second distance from said midpoint of said torsional actuator,
- said second one-way clutch connected to said rotor, such that angular displacement of said torsional actuator at said second distance from said midpoint is transmitted to the rotor.

* * * * *